United States Patent [19]

Rajput et al.

[11] 4,188,075
[45] Feb. 12, 1980

[54] ADAPTIVE ACCELERATION SYSTEM FOR VEHICLE SKID CONTROL SYSTEMS

[75] Inventors: Yudh V. Rajput, Dayton, Ohio; Gary J. Skodack, Novi, Mich.

[73] Assignee: The B. F. Goodrich Company, Akron, Ohio

[21] Appl. No.: 916,311

[22] Filed: Jun. 16, 1978

[51] Int. Cl.² .............................................. B60T 8/02
[52] U.S. Cl. .................................. 303/106; 303/105; 303/110
[58] Field of Search ............... 188/181 A; 303/20, 96, 303/97, 105, 106, 110

[56] References Cited

U.S. PATENT DOCUMENTS

| | | | |
|---|---|---|---|
| 3,552,803 | 1/1971 | Lucien | 303/20 X |
| 3,615,120 | 10/1971 | Yamazaki et al. | 303/20 X |
| 3,874,741 | 4/1975 | Schnaibel et al. | 303/106 |
| 3,929,382 | 12/1975 | McNinch, Jr. et al. | 303/106 |
| 3,944,291 | 3/1976 | Lindemann et al. | 303/20 X |
| 3,966,267 | 6/1976 | McNinch, Jr. et al. | 303/20 X |
| 4,090,741 | 5/1978 | Rajput | 303/96 |
| 4,138,164 | 2/1979 | Masclet | 188/181 A X |

FOREIGN PATENT DOCUMENTS

2402296  8/1974  Fed. Rep. of Germany ............. 303/97

Primary Examiner—Charles E. Frankfort
Assistant Examiner—Reinhard J. Eisenzopf
Attorney, Agent, or Firm—Harry F. Pepper, Jr.

[57] ABSTRACT

An adaptive acceleration system for a vehicle anti-skid brake control system effectively adapts to the coefficient of friction between the road surface and tires of a vehicle to provide variable control of the reapplication of brake pressure during spin up or acceleration of the wheels, for example after a skid has occurred. The adaptive acceleration system determines the size of acceleration in a sufficiently short time to react in real time determining and reapplying the appropriate percentage of brake pressure then being requested by the vehicle driver.

6 Claims, 2 Drawing Figures

ADAPTIVE ACCELERATION SYSTEM FOR VEHICLE SKID CONTROL SYSTEMS

BACKGROUND OF THE INVENTION

The present invention relates generally, as indicated, to anti-skid brake control systems and, more particularly, to an adaptive acceleration system therefor. The adaptive acceleration system adapts to the spin up or acceleration of the vehicle wheels and correspondingly determines and controls the reapplication of an appropriate amount of brake pressure after a pressure dump, for example, by controlling the amount of air pressure being delivered to the vehicle brake system.

Anti-skid brake control systems are shown, for example, in U.S. Pat. Nos. 3,917,359 and 4,040,676. Anti-skid brake control systems also are shown in copending U.S. patent application Ser. No. 769,255, filed Feb. 16, 1977, for "Anti-Skid Brake Control System With Power-Up Delay" and in copending U.S. patent application Ser. No. 770,535, filed Feb. 22, 1977, now U.S. Pat. No. 4,090,741, for "Anti-Skid Brake Control System With Circuit For Monitoring Slower Wheel", with both of these copending applications being commonly assigned with the present application. The disclosures of these patents and applications are incorporated by reference.

It is the principal purpose of an anti-skid brake control system to provide automatic overriding control of the brakes of a vehicle when an incipient or actual skid or a locked wheel condition (all hereinafter being referred to collectively as skid) exists. Upon detecting a skid, the system dumps part or all (hereinafter a percentage) of the brake operating fluid pressure (hereinafter air pressure) which the vehicle operator then may be attempting to apply manually, e.g. by pressing on the vehicle brake pedal with his foot. The wheels then spin up to regain traction after which full requested brake pressure is reapplied, with such operation reducing skids and their undesirable results.

In the system disclosed in the '535 application, each of plural wheels is monitored by respective transducers that detect the rotational wheel speeds and produce respective AC transducer signals having frequencies representing wheel speed. Respective frequency to voltage converters produce DC voltages having amplitudes indicative of the AC transducer signal frequencies, thus being representative of wheel speed. Moreover, a single deceleration differentiator detector responds to downward-going changes in the smaller one of the two DC voltages to produce a deceleration signal proportionally representative and indicative of the rate of deceleration of the corresponding wheel. A wheel lock detector is provided for producing an output signal causing the dumping of a fixed amount of the air pressure when a locked wheel condition occurs. A single acceleration differentiator detector responds to upward-going changes in the DC voltage indicative of the slower wheel to produce an acceleration signal proportionally representative and indicative of the spin up rate or acceleration rate of that wheel. The purpose of the acceleration detector is, after a skid condition has existed, to avoid the reapplication of full air pressure if the wheels are accelerating too rapidly, for such full reapplication could cause a further skid to occur.

However, the various prior acceleration detectors used in skid control systems were not adaptive to the coefficient of friction between the road surface and tires, for example, and, accordingly, did not vary the percentage of reapplied air pressure according thereto. It would be desirable to provide control of the reapplied air pressure according to the vehicle wheel acceleration rate.

Further, in the '535 application the advantages of effecting skid control operation in response to the more slowly rotating one of plural vehicle wheels is disclosed. For the same reasons, it would be desirable to effect the above acceleration rate responsive control of reapplied pressure in response to the more slowly rotating one of plural wheels.

Dynamic load transfer phenomenon is the change in loading of respective vehicle wheels in response to braking operation or deceleration. It has been found that the amount of frictional force between vehicle tires or wheels and a road surface, for example, to effect a braking or stopping function of the vehicle, will vary according both to the coefficient of friction (mu) between the road surface and tires and to the results of such dynamic load transfer phenomenon. It would be desirable to effect a skid control function that is adaptive to the mu condition and to the results of dynamic load transfer phenomenon, thereby to maximize braking efficiency.

Also disclosed in the '535 application is an output control circuit responsive, for example, to the magnitude of the deceleration signal to control the percentage of the requested air pressure that is in fact applied to the brakes. As is described, an air brake valve, such as one disclosed in a brochure entitled "Triple Action Skid Control", published by the B. F. Goodrich Company, March 1975, has a pair of selectively energized solenoids in a modulator valve portion which control the dumping of a percentage of the air pressure being requested by the driver. The output control circuit has four operational steps. In a step 0 operation, neither solenoid is energized, and 100% of the requested air pressure is applied to the vehicle brakes. In a step 1 operation, the output control circuit energizes one solenoid to dump about 33% of the requested air pressure, whereby approximately 67% of the requested air pressure is applied to the brakes. Similarly, in a step 2 mode, the output control circuit deenergizes the first and energizes the second solenoid to dump about 67% of the requested air pressure, thereby permitting application of about 33%; and in a step 3 mode, the output control circuit energizes both solenoids to dump 100% of the air pressure then being requested by the driver. The output control circuit also responds to a locked wheel signal from the wheel lock detector to go into a step 3 mode and, in addition, responds to production of an acceleration signal by the acceleration differentiator detector ordinarily to go into a step 2 mode.

The foregoing is, of course, described for exemplary purposes only, it being appreciated that other parameters than those mentioned may be used in the invention disclosed in the '535 application as well as in the present application.

SUMMARY OF THE INVENTION

In accordance with the present invention an adaptive acceleration system provided for a skid control system adapts to the coefficient of friction between the road surface and the vehicle tires, and, in effect, to the results of dynamic load transfer phenomenon, to control the reapplying of brake pressure after a skid, for example, has occurred. The magnitude of acceleration is determined in a sufficiently short time to react in real time determining and reapplying the appropriate amount of brake pressure. In the preferred embodiment four threshold levels corresponding to the four steps mentioned above are developed, and the percentage of reapplied air pressure (alternatively and equivalently used with the term brake pressure) is controlled in inverse relation to the acceleration threshold achieved. Although the adaptive system will be described hereinafter particularly with reference to an analog circuit implementation, it will be appreciated that the invention may be implemented, as well, utilizing a digital circuit approach.

In accordance with one aspect of the present invention, a relatively accurate low acceleration threshold is provided below which the adaptive acceleration system will not affect the over-all skid control system. However, upon slightly exceeding that threshold acceleration, the adaptive acceleration system will promptly dominate the output control circuit to cause a step 3 mode. Moreover, in response to the achieving of respective larger acceleration threshold levels, as represented by respectively larger acceleration signals, as aforesaid, respective lower step operational modes, i.e. steps 2, 1 and 0, are caused by the domination adaptive acceleration system; this operation being distinctly different from the single threshold operation disclosed, for example, in the '535 application.

Another aspect of the present invention provides dominance of the adaptive acceleration system over, for example, the deceleration detector, wheel lock detector, and various time-out memory circuits associated therewith and/or with the output control circuit. This dominance, then, enables prompt real time reaction of the anti-skid brake control system in response to the various acceleration signals detected.

Still another aspect of the invention provides an accurate representation of the acceleration period of the vehicle wheels to facilitate the accuracy and promptitude of control effected by the adaptive acceleration system.

With the foregoing in mind, it is a primary object of the invention to provide an anti-skid brake control system that is improved in the noted respects.

Another primary object is to control the reapplication of brake pressure in response to the magnitude of acceleration of the wheels of a vehicle and, more particularly, to effect such control adaptively to the coefficient of friction between the road surface and vehicle tires and, accordingly, to the results of dynamic load transfer phenomenon.

An additional object is to increase the efficiency and reliability of an anti-skid brake control system.

A further object is to determine the magnitude of acceleration of vehicle wheels that had been skidding, for example, in a sufficiently short time to react in real time to determine and to reapply an appropriate amount of brake pressure being requested by the vehicle driver to achieve efficient stopping distances under, for example, panic stop conditions.

Still another object is to reapply brake pressure to the brakes of a vehicle whose wheels have skidded and have begun accelerating above an acceleration threshold, with the amount of reapplied pressure being, in effect, in respective stages directly proportional or in relation to the magnitude of sensed wheel acceleration.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting force in detail a certain illustrative embodiment of the invention, this being indicative, however, of but one of the various ways in which the principles of the invention may be employed.

DESCRIPTION OF THE PREFERRED EMBODIMENT

Figure 1:
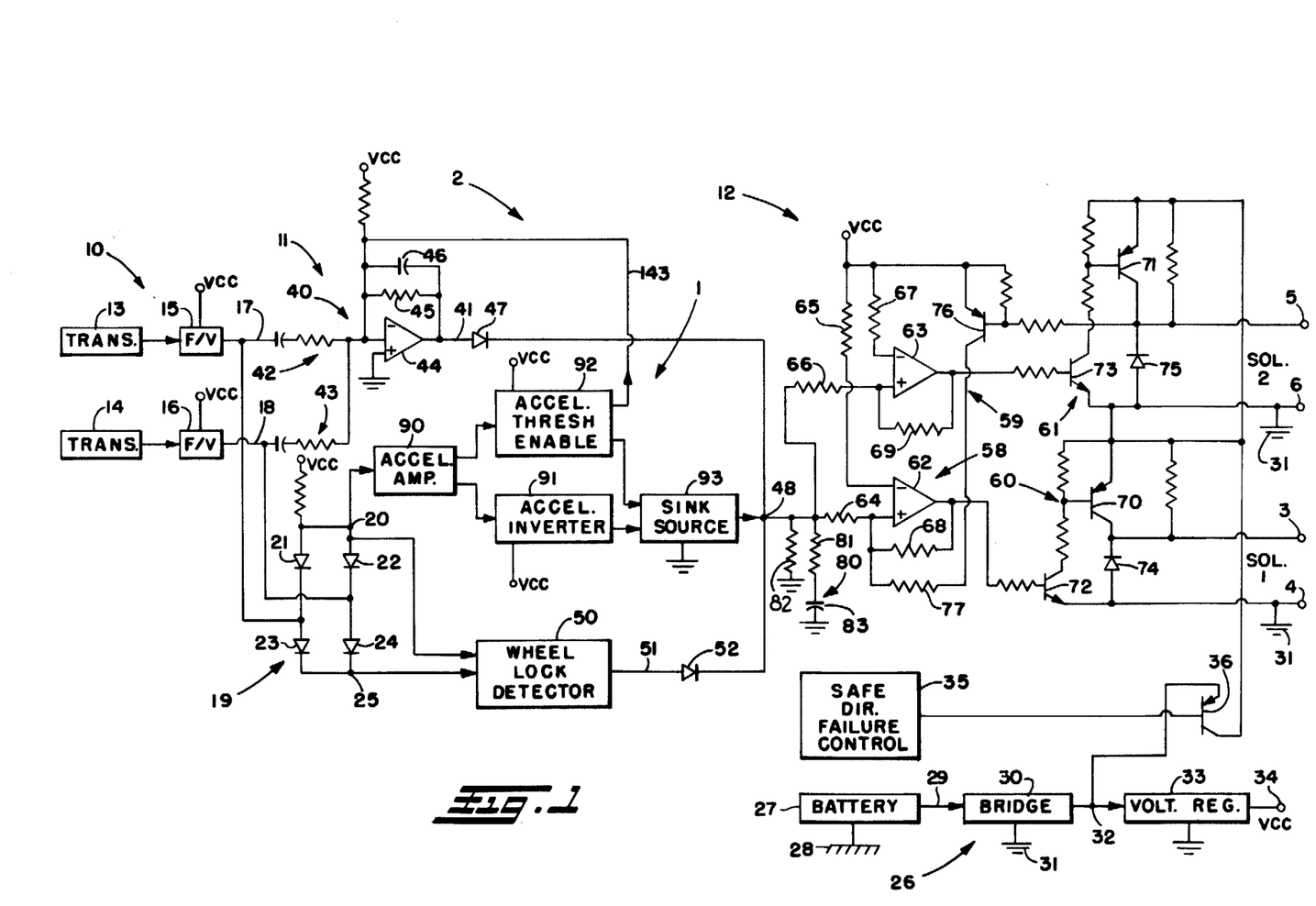
FIG. 1 is a schematic circuit diagram, partly in block form, of an adaptive acceleration system in accordance with the present invention utilized in an anti-skid brake control apparatus or system.

Referring now in detail to the drawings, wherein like reference numerals designate like parts in the several figures, and initially to FIG. 1, an adaptive acceleration system in accordance with the present invention is generally indicated at 1 as part of an anti-skid brake control apparatus or system 2. The skid control system 2 monitors the rotational speeds of the wheels of a vehicle and upon detecting a skid condition or a locked wheel condition effects dumping of a percentage of the brake operating air pressure being requested by the vehicle driver. Such dumping is effected by selectively energizing one or both of two solenoids, not shown, in an air brake valve, such as the one mentioned above, by delivery of appropriate solenoid energizing signal at respective solenoid output terminals 3, 4, 5, 6. In the preferred embodiment energization of the first solenoid by a solenoid energizing signal at terminals 3, 4 effects dumping of about 33% of the requested air pressure, whereas energization of only the second solenoid effects dumping of about 67% of the requested air pressure; and energization of both solenoids effects dumping of 100% of the requested air pressure. Although the invention is described with reference to the controlling of two such solenoids to effect dumping of the specified percentages of air pressure, it will be appreciated that fewer or more than two solenoids may be controlled and other percentages of air pressure dumped, as desired.

It is the purpose of the adaptive acceleration system 1 to detect acceleration of the vehicle wheels and to discriminate between normal accelerations, such as those up to about 15 miles per hour per second (mph/sec.) and those exceeding that threshold level. Moreover, upon sensing the exceeding of such threshold acceleration, the adaptive acceleration system 1, in inverse relation to the magnitude of acceleration controls energization of the respective solenoids. For exemplary purposes, Chart I depicts for the preferred embodiment the various accleration levels at which the adaptive acceleration system 1 is operative to cause the skid control system 2 to go into respective steps 0 through 3 modes of operation.

| CHART I | | | |
|---|---|---|---|
| ACCELERATION a(mph/sec.) | REAPPLIED PRESSURE | PRESSURE DUMPED | STEP |
| $0 \leq a < 15$ | 100% | 0% | 0 |
| $15 \leq a < 20$ | 0% | 100% | 3 |
| $20 \leq a < 100$ | 33% | 67% | 2 |
| $100 \leq a < 200$ | 67% | 33% | 1 |
| $200 \leq a <$ up | 100% | 0% | 0 |

Thus, when the vehicle wheel or wheels acceleration is about 15 mph/sec. or less, the threshold acceleration level, the adaptive acceleration system 1 will effectively be cut off so that the skid control system 2 will not energize the solenoids and full pressure requested by the vehicle driver will be applied to the brakes. However, when the acceleration is in the 15 to 20 mph/sec. range, this, after the occurrence of a skid condition, ordinarily indicating a continued low mu condition, the adaptive acceleration system 1 commands the skid control system 2 to go into a step 3 mode. On the other hand, when the acceleration exceeds about 200 mph/sec., this indicating a high mu condition with a correspondingly high degree of traction between the vehicle tires and road surface, for example, the adaptive acceleration system 1 commands the skid control system 2 to go to a step 0 mode. Moreover, the adaptive acceleration system 1 has a sharp cut-off so that when the magnitude of acceleration begins decreasing, the adaptive acceleration system 1 cuts out to terminate its dominant control function for that cycle of operation of the skid control system 2.

The skid control system 2 includes an input circuit portion 10 for developing electrical signals representative of the actual speed of one or more monitored vehicle wheels, a detector circuit portion 11 for detecting the deceleration, acceleration or locked wheel conditions indicated by such electrical signals, and an output circuit portion 12 for selectively providing the solenoid energizing signals to dump varying percentages of the requested air pressure as will be described further below.

In the input circuit portion 10, one or more transducers 13, 14, for example, associated with respective vehicle wheels produce respective AC transducer signals having frequencies proportionally representative of the respective wheel speeds. Moreover, respective frequency to voltage converters 15, 16 convert the AC transducer signals to respective generally DC voltages on lines 17, 18. The magnitudes of those DC voltages are, then, proportionally representative to the actual speeds of the monitored vehicle wheels. Each of the transducers and frequency to voltage converters may be conventional devices, as described, for example, in the '535 application. Moreover, a diode bridge rectifier circuit 19 is coupled in the manner illustrated to lines 17, 18 to provide at junction 20 a voltage that is clamped to the value of the lower of the DC voltages on lines 17, 18, whereby the DC voltage at junction 20 represents the speed of the more slowly rotating one of the plural vehicle wheels being monitored. The diodes 21, 22 of the bridge 19, then, comprise a NAND gate. The diodes 23, 24 of the bridge 19 form an OR gate and deliver to junction 25 a DC voltage representing the larger of the two DC voltages on lines 17, 18 while providing isolation of those two lines.

Electrical power for the skid control system 2 is provided by a conventional power supply 26. The power supply 26 includes, for example, the vehicle battery 27 coupled between the chassis ground 28 and an output line 29, a polarity correcting bridge rectifier circuit 30 that delivers an unregulated voltage between the circuit ground 31 and an output line 32, and a conventional voltage regulator 33, which provides on terminal 34 a regulated Vcc voltage for use throughout the system 2 being coupled, for example, to the various Vcc terminals illustrated in the drawings. A safe direction failure control circuit 35 monitors various portions of the system 2 and when the monitored portions are operating properly effects conduction in a power transistor 36 that delivers the unregulated voltage from line 32 in the power supply 26 to the output circuit portion 12 for selective delivery to the respective solenoids. When a fault is sensed by the safe direction failure control 35, it cuts off the transistor 36, thereby disabling the output circuit portion 12 to prevent energization of the solenoids, the system 2 then being disabled from effecting automatic overriding of the brake system. The power supply and safe direction failure control are described in greater detail, for example, in the '535 application.

In the detector circuit portion 11 a deceleration detector 40 is a conventional differentiating circuit that monitors downward-going changes of the respective DC voltages on lines 17, 18 and produces on line 41 a deceleration signal that is proportionally representative of the largest downward-going change. The deceleration detector 40 has a pair of differentiating capacitor and resistor circuits 42, 43 coupled, on the one hand, to the respective lines 17, 18 and, on the other hand, to the inverting input of a conventional operational amplifier 44. A feed-back resistor 45 and a feedback capacitor 46 are coupled across the output and inverting input of that amplifier. A diode 47 is part of an OR gate that couples any deceleration signal on line 41 to a junction 48 while isolating the line 41 from other signals delivered to the junction 48. It will be appreciated that the magnitude of deceleration signal delivered to junction 48 will be directly proportional to the magnitude of downward-going change in a respective DC voltage on lines 17, 18, which, in turn, represents the rate of deceleration of the respective vehicle wheels. An excessive deceleration of a vehicle wheel indicates that that wheel is going into a skid condition. The larger the deceleration of a vehicle wheel, the more likely that wheel is encountering a skid condition.

A wheel lock detector circuit 50 also is included in the detector circuit portion 11. It is the purpose of the wheel lock detector 50, which is coupled in the manner illustrated to the bridge 19 to receive, respectively, the larger and smaller of the DC voltages on lines 17 and 18, to produce a wheel locked signal on line 51 when one of the signals on lines 17 or 18 indicates a locked wheel condition. The wheel locked signal is delivered via a diode 52, which forms the other part of the OR gate with diode 47, to the junction 48. Ordinarily, the wheel lock detector 50, as is described in greater detail in the '535 application, produces a fixed magnitude wheel locked signal whenever a locked wheel condition has been detected.

The output circuit portion 12 includes a pair of threshold comparator circuits 58, 59 which in response to the magnitude of the signal, such as a voltage, and hereinafter referred to as voltage, for example, at the junction 48 effect selective operation of a pair of output circuits 60, 61 for selective delivery of solenoid energizing signals to the respective solenoids, as aforesaid.

Each threshold comparator circuit 58, 59 includes an operational amplifier 62, 63 with respective non-inverting and inverting inputs, input resistors 64–67, and feedback resistors 68, 69. Each amplifier 62, 63 produces a low, such as 0 or negative, output signal when the bias signal to its inverting input exceeds that delivered to its non-inverting input, and similarly produces a relatively high output signal when the bias signal to its non-inverting input exceeds that applied to its inverting input.

Each output circuit 60, 61 includes a power output transistor 70, 71 that is controllably biased to conduction or cut-off by respective control transistors 72, 73 selectively to deliver the solenoid energizing signals, for example, to the positive output terminals 3, 5, the terminals 4, 6, as shown, being coupled to the circuit ground 31. Moreover, the control transistors 72, 73 are selectively controlled by the amplifiers 62, 63 in the threshold comparator circuits 58, 59.

Diodes 74, 75 provide transient suppression in the output circuits.

A monitoring transistor 76 coupled to the output circuit 61 monitors conduction, particularly, of the power output transistor 71 and feeds back information concerning such conduction to the threshold comparator circuit 58 to control the step-wise operation of the threshold comparator circuits. More specifically, the monitoring transistor 76, when conductive due to non-conduction in the power output transistor 71, provides via a resistor 77 a supplemental bias signal to the non-inverting input of the amplifier 62. This supplemental bias signal reduces the magnitude of the bias signal required through the input resistor 64 to effect a high output from the amplifier 62. Therefore, as the magnitude of the voltage at the junction 48 begins to increase, for example due to the occurrence of a skid, the amplifier 62 will be the first of the two threshold comparator circuits 58, 59 to produce a high output. That high output biases the control transistor 72 to conduction, which in turn biases the power output transistor 70 to conduction to effect energization of the first solenoid. If the magnitude of the voltage at the junction 48 is still larger, being sufficient to provide via the input resistor 66 a bias signal that causes the amplifier 63 to produce a high output signal, the output circuit 61 will similarly provide a solenoid energizing signal to the second solenoid. However, the energized power output transistor 71, then, effects a cut-off of the monitoring transistor 76, which eliminates the supplemental bias signal to the amplifier 62, whereupon the output of the latter drops to its low level. A still further increase in the magnitude of the voltage at the junction 48, while continuing to effect a high output from the threshold comparator circuit 59 and a solenoid energizing signal at the output terminal 5 of the output circuit 61, will provide sufficient bias signal to the amplifier 62 effecting a high output therefrom and production of a solenoid energizing signal by the output circuit 60, thereby energizing the first solenoid simultaneously with the second to cause the aforementioned step 3 mode of operation. The immediately preceding description, then, describes operation of the skid control system 2 to effect the step-wise control of the modulator portion of an air brake valve, as described above, going from step 0 through step 3 modes of operation.

A memory circuit 80 connected to the junction 48 controls the output circuit portion 12 ordinarily to assure that after the output circuit portion has operated to one of the output steps beyond a step 0 mode, it returns back to a step 0 mode, whereby no air pressure is dumped, in a reverse order of the steps. Thus, if the output circuit portion 12 were in a step 3 mode dumping all of the requested air pressure, upon termination of the skid condition or a time-out function elsewhere in the system 2, the output circuit portion 12 would proceed via steps 2 and 1 to the step 0 mode. More specifically, the memory circuit 80 includes a pair of resistors 81, 82 and a capacitor 83. The capacitor charges to follow the voltage at the junction 48. During ordinary operation of the memory circuit 80, when the deceleration signal from line 41 and the wheel locked signal from line 51 both drop to zero, for example upon cessation of a previously detected skid condition, the voltage on the capacitor 83 artificially briefly maintains a voltage at the junction 48. That artificially maintained voltage will decay according to the discharge time constant of the capacitor 83 and the two resistors 81, 82. However, as the voltage at the junction 48 decays, then, the threshold comparator circuits 58, 59 and their respective associated output circuits 60, 61 will shut down in reverse order of their previously described energization. Therefore, upon termination of a skid condition the requested air pressure will be incrementally reapplied to reduce the possibility of a further skid.

The adaptive acceleration system 1 provides dominant control of the output circuit portion 12 when the vehicle wheels accelerate above a threshold level of normal accelerations. Below the threshold level of, for example, 15 mph/sec., the adaptive acceleration system 1 will have no effect on the system 2. However, when the magnitude of acceleration exceeds the mentioned threshold level, the adaptive acceleration system 1 in response thereto effects dominant control of the output circuit portion 12 effectively driving the same to produce a respective step 0 through step 3 mode of operation, as will be described further below.

The adaptive acceleration system 1 includes an acceleration amplifier 90 that produces outputs indicative of the acceleration of the monitored wheels, an acceleration inverter 91 that inverts the acceleration signal from the acceleration amplifier 90 to provide an output signal that is inversely proportional to the rate of acceleration, an acceleration threshold enable circuit 92 that cuts out the adaptive acceleration system 1 below the threshold acceleration level, enables the output of the adaptive acceleration system when the threshold acceleration level is exceeded, and disables the deceleration detector 40 when an acceleration signal is occurring, and a sink source output circuit 93 that provides the controlling output of the adaptive acceleration system 1. These elements 90-93 of the adaptive acceleration system 1 are coupled in the anti-skid brake control system 2 in the manner illustrated, for example, in FIG. 1.

Figure 2:
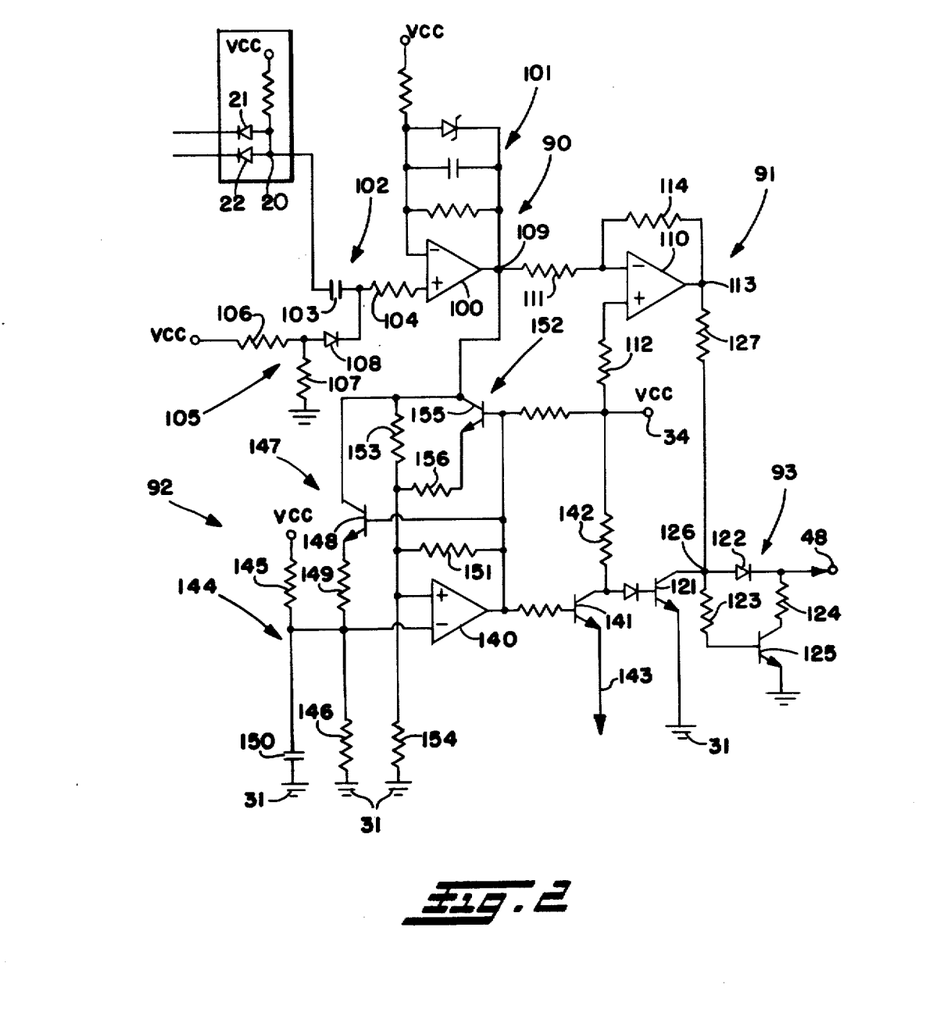
FIG. 2 is a schematic circuit diagram illustrating the details of the adaptive acceleration system of the present invention.

Turning now more particularly to FIG. 2, the adaptive acceleration system 1 is shown in detail. The acceleration amplifier 90 is coupled to the junction 20 to receive an input signal representing the speed of the more slowly rotating one of the plural wheels monitored. The acceleration amplifier 90 includes a gain amplifier 100 with a typical feed-back circuit 101 and a differentiating input circuit 102, the latter including a differentiating capacitor 103 and a resistor 104. The acceleration amplifier 90 also includes a biasing circuit 105, including a pair of resistors 106, 107 and a diode 108, such elements being coupled to the junction of the differentiating capacitor 103 and resistor 104 to initialize acceleration amplifier 90 such that it will respond immediately to the first sign of an acceleration. Moreover, the signal applied to the non-inverting input of the amplifier 100 is differentiated by the capacitor 103 so as to represent the magnitude of acceleration of the more slowly rotating one of the plural wheels being monitored. Therefore, the amplifier 100 produces an acceleration amplifier signal at the acceleration output 109 that is directly proportional to the magnitude of the acceleration signal provided via the capacitor 103 and resistor 104.

The acceleration inverter 91 is an inverting amplifier circuit including a conventional amplifier 110 with input resistors 111, 112 coupled, respectively, to its inverting and non-inverting inputs, an inverting amplifier output 113, and a feed-back resistor 114 coupled between the output 113 and the inverting input. The gain of the inverting amplifier circuit preferably is less than 1. The input resistor 112 is connected to the Vcc voltage terminal 34 to provide a bias voltage to the non-inverting input of the amplifier 110 so that the latter operates as an inverting amplifier. The input resistor 111 is coupled to the acceleration amplifier output 109 to provide a variable voltage signal to the inverting input of the amplifier 110 as determined by the magnitude of the acceleration amplifier signal.

The inverter output signal will be inversely proportional to such acceleration amplifier signal so the inverter output signal may be considered an inverted acceleration output signal. It is this inverse proportionality relationship that enables the adaptive acceleration system 1 to operate in the manner depicted in Chart I, whereby the percentage of the requested air pressure that is dumped is step-wise inversely proportional to the magnitude of the detected acceleration.

To enable and to disable the adaptive acceleration system 1, the acceleration threshold enable circuit 92 controls the disabling transistor 121. When disabling the system 1, the disabling transistor 121 is biased to conduction thereby to assure that the normal high inverter output signal from the acceleration inverter 91 is directed to the circuit ground 31. On the other hand, to enable the system 1, the disabling transistor 121 is cut off so that the inverter output signal is directed to the sink source circuit 93 to effect control of the voltage at the junction 48. The sink source circuit 93 includes a diode 122, a pair of resistors 123, 124, and a transistor 125.

The junction 126 is the input to the sink source circuit 93 and receives the inverter output signal via a resistor 127. The magnitudes of the resistors 123, 124 are such that the former is larger than the latter. Therefore, referring, for example, to Chart I above, when the system 1 is enabled and the detected acceleration is in the 15–20 mph/sec. range, the inverter output signal delivered to the junction 126 will be sufficiently high to assure that the magnitude of the signal delivered to the junction 48 forces the output circuit portion 12 promptly to assume a step 3 mode of operation energizing both of the solenoids, as aforesaid. During such operation the circuit 93 acts as an electrical source. However, if the acceleration detected by the system 1 is, for example, in the 20–100 mph/sec. range, the magnitude of the inverter output signal will have decreased sufficiently to cause the circuit 93 to act as an electrical sink to discharge promptly the memory circuit 80 (FIG. 1), assuming, for example, that the latter had been at a higher voltage of a step 3 operation, until the voltage at the junction 48 is at the proper level to cause the output circuit portion 12 to assume a step 2 mode of operation energizing only the second solenoid, as aforesaid. Of course, if the memory circuit 80 were at a voltage causing step 1 operation, and the detected acceleration went to the 20–100 mph/sec. range, the sink source circuit 93 would act as a source, as aforesaid. Similar operation occurs when the detected acceleration is in the 100–200 mph/sec. range to cause the output circuit portion 12 to assume a step 1 mode of operation and when the detected acceleration is above 200 mph/sec. to cause the output circuit portion 12 to assume a step 0 mode of operation. Thus, as long as the system 1 is enabled by the acceleration threshold enable circuit 92, the sink source circuit 93 functions as an electrical sink to discharge the memory circuit 80 to an appropriate level, if necessary, and as an electrical source to maintain the signal at the junction 48 at a predetermined level to obtain the desired mode of operation of the output circuit portion 12.

In the just described manner, the sink source circuit 93 dominates or forces the output circuit portion 12 to assume the desired step mode of operation promptly. For example, the sink transistor 125 by effecting prompt discharging of the memory circuit 80 enables the output circuit portion 12 to jump, say, from a step 3 mode of operation in response to a large deceleration having been detected substantially directly to a step 1 or a step 0 mode of operation upon encountering a large wheel acceleration.

The acceleration threshold enable circuit 92 includes a comparator amplifier 140, which in response to the bias or threshold signals delivered to its inverting and non-inverting inputs provides relatively low or relatively high comparator signals at its output, respectively, to bias an inverting or enabling output transistor 141 to non-conduction or to conduction. A low comparator signal is a disabling one for the system 1; such low comparator signal cuts off the inverting transistor 141, which allows the disabling transistor 121 to be normally biased to conduction via the resistor 142, thereby removing any inverter output signal from the sink source circuit 93. Conversely, a high comparator signal enables the system 1 by effecting conduction in the inverting transistor 141 to cut off the disabling transistor 121, thus allowing the inverter output signal to reach the sink source circuit 93, effectively enabling the latter. Moreover, a connection 143 between the inverting transistor 141 and the inverting input of the deceleration detector 40 will provide, when the inverting transistor 141 is conductive, a relatively large positive signal to such inverting input, thereby driving the output of the amplifier 44 to a zero value effectively disabling the deceleration detector. Accordingly, the deceleration detector 40 is disabled whenever the adaptive acceleration system is enabled.

Coupled to the inverting input of the comparator amplifier 140 is a stable threshold circuit 144, including resistors 145, 146 forming a divider circuit to provide a stable relatively low level or magnitude bias signal to such inverting input. Also, a high variable threshold circuit 147, including a transistor 148 and a resistor 149, is connected to such inverting input. When the transistor 148 is biased to conduction in response to a high level comparator signal at the output of the comparator amplifier 140, a high variable threshold bias signal is delivered to such inverting input. The magnitude of such high variable bias signal is determined by the magnitude of the acceleration amplifier signal at the acceleration amplifier output 109 and the magnitudes of the resistors 146, 149, which form a resistance divider. In a preferred embodiment of the invention, that resistance divider provides to the inverting input, when the transistor 148 is conductive, a high variable bias signal equal to approximately 65% of the acceleration amplifier signal.

A memory capacitor 150 connected between the inverting input of the comparator amplifier 140 and the circuit ground 31 charges to and maintains or remembers the voltage of the bias signal being delivered to such inverting input. Therefore, when the transistor 148 is conductive, the memory capacitor will charge to the voltage of the high variable bias signal delivered to the comparator amplifier 140 and will maintain that voltage, even after the transistor 148 has been cut off, for a period of time determined by the cooperative RC time constant of the capacitor 150 and resistor 146.

Connected between the output and the non-inverting input of the comparator amplifier 140 is a typical feedback resistor 151. Also connected to such non-inverting input is a variable gain bias circuit 152, which includes, on the one hand, a first resistance divider circuit with resistors 153, 154 that delivers to the non-inverting input a relatively low percentage or portion of the acceleration amplifier signal, say about 23% thereof. The variable gain bias circuit 152 also includes a transistor 155 and a resistor 156, which, when the transistor is conductive, is effectively coupled in parallel with the resistor 153 to provide a relatively larger percentage, say about 75%, of the acceleration amplifier signal to the non-inverting input of the comparator amplifier 140.

It has been discovered that for the accelerations encountered after termination of a skid condition ordinarily the magnitude or rate of acceleration of the vehicle wheels will increase relatively rapidly to a maximum or peak level; thereafter, such acceleration rate will relatively gradually decline. Therefore, when produced, the acceleration amplifier signal at the output 109 of the acceleration amplifier 90 will have a relatively sharp rise or leading edge and a relatively sharp decline or trailing edge, with various holding levels between the leading and trailing edges. The magnitude and rate of such rises and falls of the acceleration amplifier signal may vary widely from one acceleration cycle to the next and within a given acceleration cycle itself depending on the actual physical phenomena occurring at the vehicle wheels. Without relatively well defined boundaries of the acceleration amplifier signal, such as boundaries that would be encountered at the sharply defined leading and trailing edges of a typical square wave, the adaptive acceleration system 1 might encounter certain undesirable instabilities, for example as the acceleration amplifier signal may vary or oscillate slightly as it goes through a value equal to the threshold acceleration level during low levels of acceleration; such instability may undesirably cause a similar instability in the output circuit portion 12 of the over-all skid control system 2.

Therefore, it is a primary purpose of the acceleration threshold enable circuit 92 to determine a valid acceleration period with sharply or well defined boundaries during which the adaptive acceleration system 1 will be enabled to provide its dominant control of the output circuit portion 12 of the brake control system 2 while avoiding the mentioned instabilities. To that end, the enable circuit 92 maintains the system 1 disabled while the magnitude of the acceleration amplifier signal is below the threshold acceleration level of, for example, 15 mph/sec. The valid acceleration period begins, according to the threshold enable circuit 92, when the threshold acceleration level is exceeded and terminates upon sensing a sharp decline in acceleration amplifier signal. During a given acceleration cycle, after the threshold acceleration level has been exceeded to start a valid acceleration period, the threshold enable circuit determines the terminating boundary of such period with automatic adjustment according to the rate at which the magnitude of acceleration signal decreases from its maximum level achieved during the given cycle. In the preferred embodiment, the valid acceleration period will terminate when the magnitude of the instant acceleration declines sharply.

In operation of the acceleration threshold enable circuit 92, then, as long as the acceleration amplifier signal is below the threshold acceleration level, the stable bias signal provided the inverting input of the comparator amplifier 140 will cause the latter to produce a low disabling comparator signal. However, when the acceleration amplifier signal exceeds the threshold acceleration level, as was mentioned above, the percentage of that acceleration amplifier signal provided via the resistance divider 153, 154 to the non-inverting input of the comparator amplifier 140 will cause the latter to produce a high enabling comparator signal. Such high comparator signal, as was described above, operates through the inverting transistor 141 to disable the deceleration detector 40 and to cut off the threshold enabling transistor 121, thereby enabling the sink source circuit 93 to operate as above. Moreover, the high comparator signal also biases the transistors 148 and 155 to conduction, thereby in effect pumping up the signals provided the inputs to the comparator amplifier 140. Accordingly, the high variable threshold circuit 147 provides a percentage, say 65%, of the acceleration amplifier signal to the inverting input. The memory capacitor 150 will charge to a maximum voltage equal to the maximum value of the high variable bias signal, i.e. the given percentage of the acceleration amplifier signal delivered to the inverting input. Also, the conductive transistor 155 assures that a relatively high percentage, say 75%, of the acceleration amplifier signal is delivered to the non-inverting input of the comparator amplifier 140. By assuring that the percentage of the acceleration amplifier signal delivered to the non-inverting input is larger than the percentage delivered to the inverting input, the comparator amplifier 140, after the threshold acceleration level has been achieved, will continue producing a high comparator signal as the acceleration amplifier signal continues to increase toward its peak value. Further, since the memory capacitor 150 retains the aforementioned percentage of the peak value of the high variable bias signal delivered to the inverting input of the comparator amplifier 140 for a long period of time relative to the time required for the acceleration amplifier signal to decline in most circumstances, the comparator amplifier 140 will continue producing a high comparator signal until the acceleration amplifier signal has declined sufficiently that the high percentage thereof delivered to the non-inverting input drops below the critical level of the peak value stored in the memory capacitor 150. When that critical level is reached, the comparator amplifier 140 will produce a low comparator signal, on the one hand, cutting off the transistors 148, 155 and, on the other hand, disabling the adaptive acceleration system 1. Further, the parameters of the memory capacitor 150 and its discharging resistor 146 are so chosen that the comparator signal will be maintained at its low level as the acceleration amplifier signal continues to decline toward a zero level.

Such operation of the acceleration threshold enable circuit 92 improves the efficiency of the systems 1 and 2.

It will be appreciated that after enabled operation of the adaptive acceleration system 1 to provide its dominant control of the output circuit portion 12 and subsequent disabling of the system 1, the output circuit portion 12, unless it is otherwise operated by other circuit portions in the detector circuit portion 11, will revert back to a step 0 mode of operation. In other words, if the adaptive acceleration system 1 had driven the output circuit portion 12 to a step 0 mode of operation, the latter would remain in that step, for the capacitor 83 would be sufficiently discharged when the disabling transistor 121 is made conductive again. However, if the adaptive acceleration system 1 had driven the output circuit portion 12 to a step 2 mode of operation, upon disabling of the system 1, the output circuit portion 12 would in a step-wise manner revert back toward a step 0 mode according to the usual discharge control of the memory circuit 80.

In view of the foregoing description, the adapting of an anti-skid brake control system to effect controlled dumping of requested air pressure during wheel acceleration in response to coefficient of friction and dynamic load transfer phenomenon, as represented by wheel acceleration values, now will be apparent.

The embodiments of the invention in which an exclusive property or privilege is claimed are defined as follows:

1. An anti-skid brake control system for automatically overriding manual control of a vehicle brake system in response to changes in vehicle wheel speed indicative of a skid condition or the like, comprising transducer means for producing an electrical signal representative of the speed of at least on vehicle wheel, detector means responsive to changes in such wheel speed as represented by such electrical signal for detecting deceleration of a magnitude indicative of an actual or incipient skid, control means for overriding such vehicle brake system in proportion to such detected deceleration, acceleration detector means for responding to acceleration of such vehicle wheel to produce an acceleration signal representative of such acceleration, and output means for controlling such control means to effect such overriding in inverse relation to the magnitude of such detected acceleration and further comprising enabling means for enabling said output means to effect such controlling when such vehicle wheel acceleration exceeds a predetermined threshold and until after such acceleration has begun decreasing, and wherein said output means includes means for disabling said detector means when enabling said output means.

2. An adaptive acceleration system for a vehicle skid control apparatus which includes control means for automatically overriding manual brake operation in direct relation to the magnitude of a skid or the like, comprising:
    (A) acceleration detector means for responding to acceleration of a vehicle wheel to produce an acceleration signal representative of such acceleration;
    (B) output means for controlling such apparatus to effect such overriding in inverse relation to the magnitude of such detected acceleration, said output means comprising inverter means for producing an inverted acceleration output signal that is inversely related to such accelerations signal; and
    (C) output control means response to such inverted acceleration output signal for forcing operation of said control means to effect such automatic overriding in direct relation to such inverted acceleration output signal and, therefore, in inverse relation to such acceleration signal and wheel acceleration, said output control means comprising;
        (1) a sink source circuit including a transistor with a control and plural output terminals,
        (2) a first resistor coupled to the control electrode of said transistor,
        (3) a second resistor coupled to one of said output terminals,
        (4) means for coupling the other of said output terminals to a source of reference potential,
        (5) rectifier means coupled between said resistors at ends remote from said transistor for selectively isolating said resistors,
        (6) means for delivering said inverted acceleration output signal to the junction of said first resistor and rectifier means, and
        (7) means for coupling the junction of said second resistor and rectifier means to said control means.

3. An adaptive acceleration system for a vehicle skid control apparatus, which ordinarily automatically overrides manual operation of a brake upon sensing a skid or the like, comprising:
    (A) acceleration detector means for responding to acceleration of a vehicle wheel to produce an acceleration signal representative of such acceleration;
    (B) output means for controlling such apparatus to effect such overriding in inverse relation to the magnitude of such detected acceleration; and
    (C) enable control means for normally disabling said output means from effecting such controlling and in response to the magnitude of such vehicle wheel acceleration exceeding a threshhold value enabling such output means, said enable control means comprising;
        (1) comparator means for comparing a stable bias signal with at least a predetermined portion of such acceleration signal to produce when the latter exceeds the former an enabling signal to enable said output means, and
        (2) continuing means for continuing production of such enabling signal to enable said output means after initial production of such enabling signal until after the magnitude of such vehicle wheel acceleration has begun decreasing, wherein said comparator means has first and second inputs, said continuing means comprises a first bias circuit means for delivering to said first input in supplement to such stable bias signal a first variable bias signal proportional to such acceleration signal, memory means for storing for a duration such first variable bias signal to maintain the same effective magnitude thereof as an input signal to said first input after such acceleration signal begins decreasing, and second variable bias circuit means for delivering to said second input a second variable bias signal proportional to such acceleration signal and of larger proportion thereof than such portion of such acceleration signal.

4. The system of claim 3, wherein said second variable bias circuit means includes means for producing such second variable bias signal as a larger proportion of such acceleration signal than that of such first variable bias signal.

5. The system of claim 4, wherein said enabling means includes means responsive to the output of said comparator upon the latter producing an enabling signal for operating said variable bias circuit means to apply such variable bias signals to said inputs, thereby to continue production of such enabling signal until the magnitude of such second variable bias signal decreases below that of such first variable bias signal stored in said memory circuit means.

6. An adaptive acceleration system for a vehicle skid control apparatus, which ordinarily automatically overrides manual operation of a brake upon sensing a skid or the like, comprising:

(A) acceleration detector means for responding to acceleration of a vehicle wheel to produce an acceleration signal representative of such acceleration;

(B) output means for controlling such apparatus to effect such overriding in inverse relation to the magnitude of such acceleration; and (C) enabling means for enabling said output means to effect such controlling when such vehicle wheel acceleration exceeds a predetermined threshold and until after such acceleration has begun decreasing; wherein said output means comprises inverter means coupled to said acceleration detector means for inverting such acceleration signal to produce an inverted output acceleration signal inversely related to such vehicle wheel acceleration, and sink source circuit means responsve to such inverted output acceleration signal and coupled to the apparatus for forcing operation of the latter in response to such latter signal, and means for coupling said enabling means to said sink source circuit means to provide enabling and disabling control thereof; and wherein the apparatus includes a deceleration detector means for detecting vehicle wheel deceleration, and wherein said enabling means includes means for disabling said deceleration detector means when said sink source circuit means is enabled.

* * * * *